(12) United States Patent
Buchner

(10) Patent No.: US 9,931,721 B2
(45) Date of Patent: Apr. 3, 2018

(54) INSTALLATION SYSTEM FOR CEILING MOUNTED ITEMS

(75) Inventor: David J. Buchner, West Allis, WI (US)

(73) Assignee: Accelerated Fastening, LLC, Janesville, WI (US)

( * ) Notice: Subject to any disclaimer, the term of this patent is extended or adjusted under 35 U.S.C. 154(b) by 1440 days.

(21) Appl. No.: 12/642,425

(22) Filed: Dec. 18, 2009

(65) Prior Publication Data

US 2011/0150590 A1   Jun. 23, 2011

(51) Int. Cl.
| | |
|---|---|
| *B23B 51/12* | (2006.01) |
| *B25B 23/00* | (2006.01) |
| *B25B 31/00* | (2006.01) |
| *B25G 1/04* | (2006.01) |
| *B23Q 1/70* | (2006.01) |
| *B25B 13/48* | (2006.01) |

(52) U.S. Cl.
CPC ............ *B23Q 1/703* (2013.01); *B23B 51/12* (2013.01); *B23B 51/126* (2013.01); *B25B 13/481* (2013.01); *B25B 23/0021* (2013.01); *B25B 31/00* (2013.01); *B25G 1/04* (2013.01); *Y10T 29/53991* (2015.01); *Y10T 279/3418* (2015.01); *Y10T 408/957* (2015.01)

(58) Field of Classification Search
CPC ..... B23B 51/12; B23B 51/126; B25B 13/481; B25B 23/0021; B25B 31/00; B23Q 1/703; B25G 1/04; Y10T 408/957
USPC ............ 408/239 A; 279/14, 86, 143–145; 227/119, 139, 140; 81/44, 53.1
See application file for complete search history.

(56) References Cited

U.S. PATENT DOCUMENTS

| | | | | |
|---|---|---|---|---|
| 2,137,574 A | * | 11/1938 | Kromer | 180/165 |
| 3,005,292 A | * | 10/1961 | Reiland | 52/99 |
| 3,973,784 A | * | 8/1976 | Smith | 279/144 |
| 4,007,795 A | * | 2/1977 | Gawron et al. | 173/50 |
| 4,076,444 A | | 2/1978 | Siebrecht | |
| 4,218,795 A | * | 8/1980 | Ernst et al. | 7/158 |
| 4,400,028 A | * | 8/1983 | Conrad | B25B 13/481 173/213 |
| 4,413,937 A | * | 11/1983 | Gutsche | 408/239 A |
| 4,615,402 A | | 10/1986 | Eisenloeffel | |
| 4,867,249 A | * | 9/1989 | Watkins et al. | 173/29 |
| 4,890,779 A | * | 1/1990 | Giannuzzi | 227/139 |
| 5,030,043 A | * | 7/1991 | Fischer et al. | 408/241 R |
| 5,110,145 A | * | 5/1992 | Stewart | 279/24 |
| 5,191,666 A | * | 3/1993 | Corbin | 7/158 |
| 5,409,333 A | * | 4/1995 | Hu | 408/239 A |
| 5,507,209 A | * | 4/1996 | Allen | B25B 13/48 81/124.2 |
| 5,624,214 A | | 4/1997 | Carroll | |
| 5,809,851 A | * | 9/1998 | Thompson | B25B 13/48 81/124.2 |
| 5,979,913 A | * | 11/1999 | Kosik et al. | 279/145 |

(Continued)

FOREIGN PATENT DOCUMENTS

| | | | | | |
|---|---|---|---|---|---|
| DE | 4400356 A1 | * | 7/1995 | | E04B 1/41 |
| GB | 2063114 A | * | 6/1981 | | B23B 31/00 |

*Primary Examiner* — Eric A Gates
(74) *Attorney, Agent, or Firm* — Joseph S. Heino

(57) ABSTRACT

The present invention is an installation system for ceiling mounted items that is comprised of a tubular hollow extension. The first end of the tubular hollow extension is adapted to receive a suspension member and the second end is adapted to be attached to a drill bit or operated manually.

3 Claims, 5 Drawing Sheets

(56) References Cited

U.S. PATENT DOCUMENTS

| | | | |
|---|---|---|---|
| 6,033,162 A * | 3/2000 | Uebele et al. | 408/239 R |
| 6,171,033 B1 | 1/2001 | Wrobel | |
| 6,786,116 B2 * | 9/2004 | Dockery | B25B 13/06 |
| | | | 279/46.3 |
| 6,786,491 B2 * | 9/2004 | Carbonneau | 279/89 |
| 6,935,821 B2 * | 8/2005 | Bodin et al. | 411/29 |
| 7,127,972 B2 * | 10/2006 | Klein | B23B 51/126 |
| | | | 81/177.2 |
| 8,061,000 B2 * | 11/2011 | Santamarina et al. | 29/275 |
| 8,166,624 B2 * | 5/2012 | Andreasen | B25B 31/00 |
| | | | 29/254 |
| 8,671,805 B2 * | 3/2014 | Henderson | B25B 13/481 |
| | | | 29/813 |
| 2004/0134312 A1 * | 7/2004 | Hodges | 81/27 |
| 2005/0247462 A1 * | 11/2005 | Meixner et al. | 173/48 |
| 2007/0127994 A1 | 6/2007 | Welker | |
| 2008/0181740 A1 | 7/2008 | Waitszies | |
| 2013/0161038 A1 * | 6/2013 | Prunean | 173/1 |

* cited by examiner

INSTALLATION SYSTEM FOR CEILING MOUNTED ITEMS

CROSS-REFERENCE TO RELATED APPLICATIONS

None

FIELD OF INVENTION

The present invention relates to the field of tool attachments and more specifically to a drill bit extension.

GLOSSARY

Figure 1A:
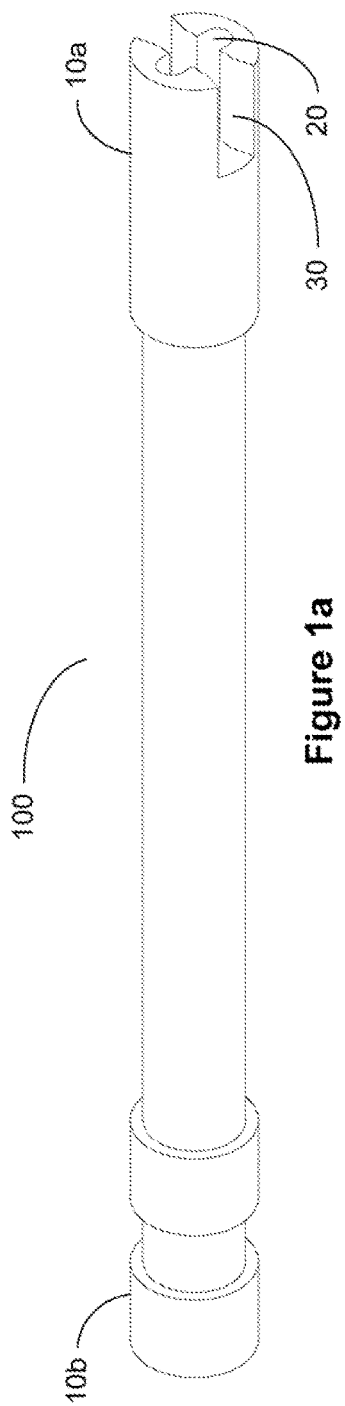
FIG. 1a illustrates a perspective view of an exemplary embodiment of an extension for an installation system for ceiling mounted items.

As used herein, the term "suspension member" refers to a component which is used to suspend a component from a ceiling. For example, a suspension member may be a wire, pin, string, chain, cord, rope or another attachment component which may be threaded through an aperture in an eyelet member.

As used herein, the term "concrete anchor" is a wedge, fastener, anchor, support, clasp, pin, nail, screw or any functionally equivalent component designed to be secured, screwed, pounded or otherwise affixed to concrete, brick, block, cement or mortar material to affix a securing component. A concrete anchor may or may not be designed to expand or separate when inserted into a concrete base material.

As used herein, the term "eyelet member" is a component of a concrete anchor that has an aperture or eyelet for receiving a securing component adapted to be mounted into the ceiling and capable of being mounted into a ceiling. For example, an eyelet member may be a concrete anchor, fastener or fastening pin having an aperture.

As used herein, the term "boring member" is a component of a concrete anchor which is inserted into a ceiling and which is secured, screwed, pounded or otherwise affixed to concrete, brick, block, cement or mortar material to affix a securing component.

As used herein, the term "radial variation" means having a radius or diameter that varies along a single component (e.g., along the outer surface of a hollow tubular structure).

BACKGROUND

Tool attachments for use with hand drills are well known in the art. Tool attachments, such as drill extensions, may be used to reach spots where there is limited space available for inserting a drill and bit. For example, when drilling into a ceiling, ductwork, wires and other obstructions may prevent a drill and bit from being able to get close enough to the ceiling. In such cases, a drill extension may be added to a drill bit allowing the necessary hole to be drilled. One example of a drill extension known in the art is disclosed by U.S. Pat. No. 5,624,214 (Carroll '214).

To install ceiling mounted items, the individual must elevate his or her body in order to access the ceiling. Usually this is accomplished using a ladder, stilts, or scaffolding. Once elevated, the individual drills a hole into the ceiling and then pounds a fastener (e.g., a concrete anchor) into the hole, which generally requires the use of two hands. Once installed, a wire is threaded through the eyelet in the fastener. The individual then moves onto the next location.

This method of installing ceiling mounted items is not desirable because multiple steps are needed to install the fastener and wire; and inserting the fastener requires the use of both hands while balancing (e.g., on a ladder or stilts). In addition, the use of both hands to pound in the fastener necessitates putting down the drill, which increases the installation time.

It is desirable to have an installation system that reduces the number of steps needed to install ceiling mounted items.

It is further desirable to have an installation system for installing ceiling mounted items that is safer to use than the current method.

SUMMARY OF THE INVENTION

The present invention is an installation system for ceiling mounted items that is comprised of a tubular hollow extension. The first end of the tubular hollow extension is adapted to receive a suspension member and the second end is adapted to be attached to a drill bit or operated manually.

DETAILED DESCRIPTION OF INVENTION

For the purpose of promoting an understanding of the present invention, references are made in the text to exemplary embodiments of an installation system for ceiling mounted items, only some of which are described herein. It should be understood that no limitations on the scope of the invention are intended by describing these exemplary embodiments. One of ordinary skill in the art will readily appreciate that alternate but functionally equivalent components, sizes and materials may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1a illustrates a perspective view of an exemplary embodiment of tubular hollow extension 100 for an installation system for ceiling mounted items. Tubular hollow extension 100 is adapted to be mounted on a drill bit (not shown) and has first end 10a and second end 10b. First end 10a includes eyelet channel 20 adapted to receive an eyelet member (not shown) and suspension member channel 30 adapted to receive a suspension member. Second end 10b is adapted to be attached to a drill bit.

Figure 1B:
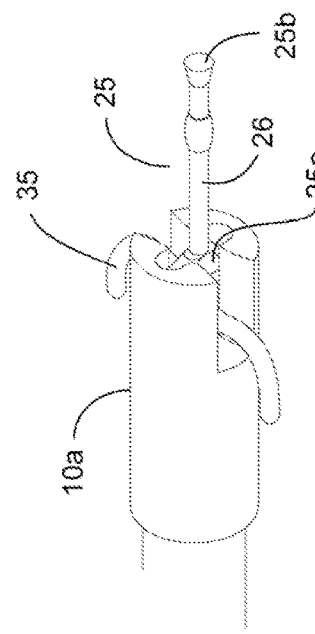
FIG. 1b illustrates a perspective view of the first end of an exemplary embodiment of an extension with eyelet member and suspension member.
Figure 1C:
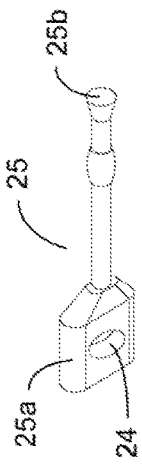
FIG. 1c illustrates a perspective view of a concrete anchor.

In the embodiment shown, eyelet channel 20 is oval-shaped to accommodate eyelet member 25a (FIG. 1c). In other embodiments, eyelet channel 20 may be circular, square or of another shape which accommodates and steadies eyelet member 25a so that concrete anchor 25 (FIG. 1c) can be installed into a ceiling.

In the embodiment shown, tubular hollow extension 100 is manufactured from stainless steel and is approximately ten inches in length. In other embodiments, tubular hollow extension 100 may be manufactured from a different material and may be shorter or longer.

In the embodiment shown, tubular hollow extension 100 has radial variations which reduce the amount of material and the weight of tubular hollow extension 100. It is desirable to reduce weight since a user is holding hollow tubular extension above their head.

FIG. 1b illustrates a perspective view of first end 10a of hollow tubular extension 100 with concrete anchor 25 having eyelet member 25a and boring member 25b inserted into eyelet channel 20. In the embodiment shown, concrete anchor 25 is a wedge (e.g., a tie wire wedge) or pin structure known in the art comprised of eyelet member 25a and boring member 25b. Eyelet member 25a is flattened panel which includes aperture 24 (FIG. 1c), neck 26 and boring member 25b which is capable of penetrating concrete. Threaded through aperture 24 is suspension member 35. Suspension member channel 30 accommodates suspension member 35 when eyelet member 25a is placed inside eyelet channel 20.

In the embodiment shown, suspension member 35 is a wire, but in other embodiments may be a pin, string, chain, cord, rope or another attachment component which can be threaded through aperture 24 in eyelet member 25a. In still other embodiments, eyelet member 25a is a component of a concrete anchor or another type of fastener known in the art.

To install concrete anchor 25 into a ceiling, hollow tubular extension 100 is placed over the end of a drill bit (when drill bit is facing upward) and eyelet member 25a with suspension member 35 is placed in eyelet channel 20 so that suspension member 35 resides in suspension member channel 30. Concrete anchor 25 is then placed against a ceiling and the drill is used to apply pressure to hollow tubular extension 100 and eyelet member 25a so that boring end 25b of concrete anchor 25 is inserted in a predrilled hole in the ceiling. The installer can use one of his or her hands for balance while inserting concrete anchor 25 into the ceiling.

FIG. 1c illustrates concrete anchor 25 having eyelet member 25a, boring member 25b, and aperture 24 into which a securing means (such as wire or a rod) is inserted. Concrete anchor 25 may be a fastening pin, tie wire wedge or other functionally equivalent device known in the art.

Figure 2:
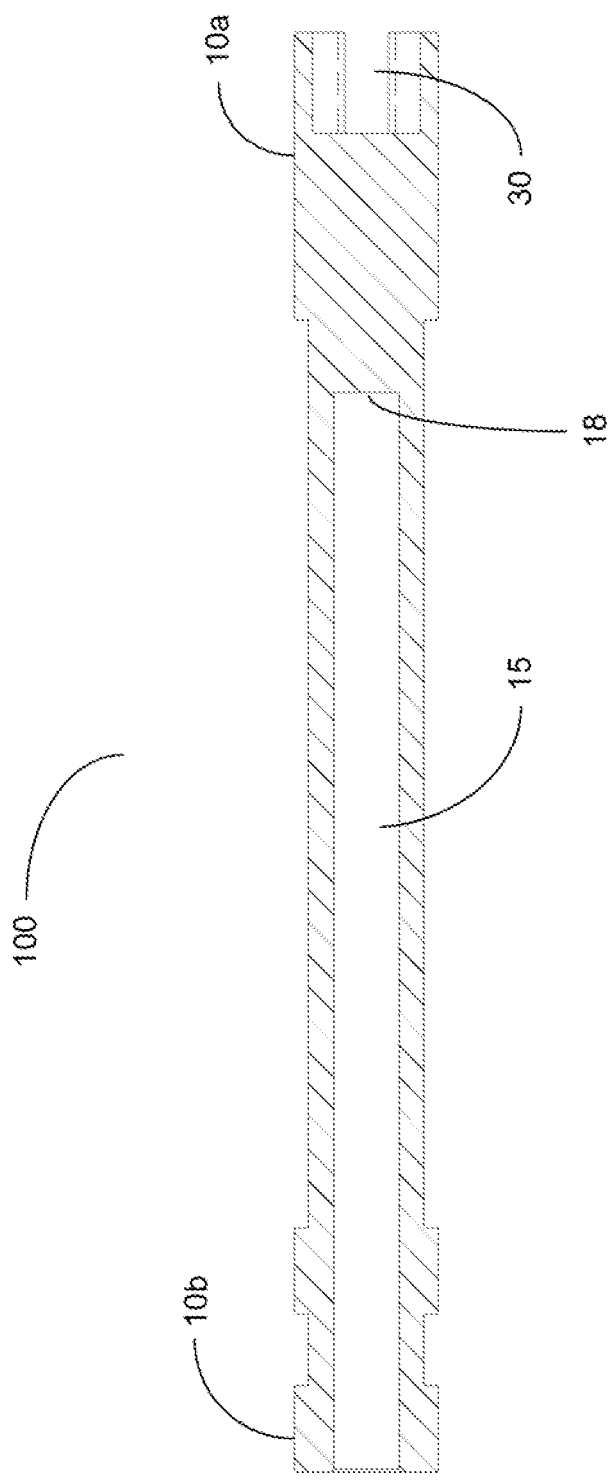
FIG. 2 illustrates a sectional view of an exemplary embodiment of an extension.

FIG. 2 illustrates a sectional view of an exemplary embodiment of tubular hollow extension 100. In the embodiment shown, second end 10b of tubular hollow extension 100 is placed over the end of a drill bit (not shown). The drill bit resides loosely inside hollow channel 15 and the drill bit shaft rests against end 18 of hollow channel 15 preventing tubular hollow extension 100 from contacting the chuck of the drill (not shown). Also visible is suspension member channel 30. In the embodiment shown, suspension member channel 30 is square; however, in other embodiments, may be of another shape and/or size to accommodate a suspension member.

Figure 3:
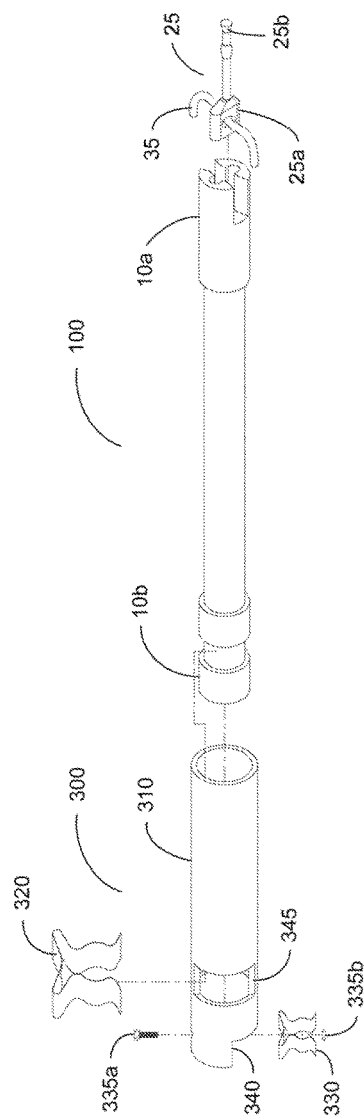
FIG. 3 illustrates an exploded view of an exemplary embodiment of a clamp system for securing an extension.

FIG. 3 illustrates an exploded view of an exemplary embodiment of clamp system 300 for securing hollow tubular extension 100 to a drill bit, hollow tubular extension 100, and concrete anchor 25. Without clamp system 300, hollow tubular extension 100 only rests on drill bit and will fall off if the drill is tipped at a downward angle. Clamp system 300 secures hollow tubular extension 100 to the drill bit so that hollow tubular extension 100 will not fall off if the drill is tipped at a downward angle, which allows hollow tubular extension 100 to be used to insert an eyelet member into a floor.

In the embodiment shown, clamp system 300 is comprised of sleeve 310, tubular structure clamp 320, and drill bit clamp 330. In the embodiment shown, sleeve 310 has machined contours 340 and 345 which accommodate drill bit clamp 330 and tubular structure clamp 320 respectively and are adapted to receive tubular hollow extension 100. Drill bit clamp 330 is secured inside sleeve 310 using drill bit clamp screw 335a and nut 335b so that the clamp portion of drill bit clamp 330 faces toward the center of sleeve 310.

Drill bit clamp 330 is clamped to the drill bit (not shown) securing sleeve 310 to the drill bit. Tubular hollow extension 100 is slid inside sleeve 310 so that second end 10b rests against drill bit clamp 330 and the narrower portion of second end 10b lines up with machined contour 345 of sleeve 310 of clamp system 300. Tubular structure clamp 320 is then clamped over machined contour 345 securing tubular hollow extension 100 inside sleeve 310.

In the embodiment shown, sleeve 310, tubular structure clamp 320 and drill bit clamp 330 are manufactured from stainless steel. In other embodiments, they may be manufactured from various other materials. In other embodiments, drill bit clamp 330 and/or tubular structure clamp 320 may be replaced with pins, screws, welded components, a ball bearing system or any other securing means known in the art.

Figure 4:
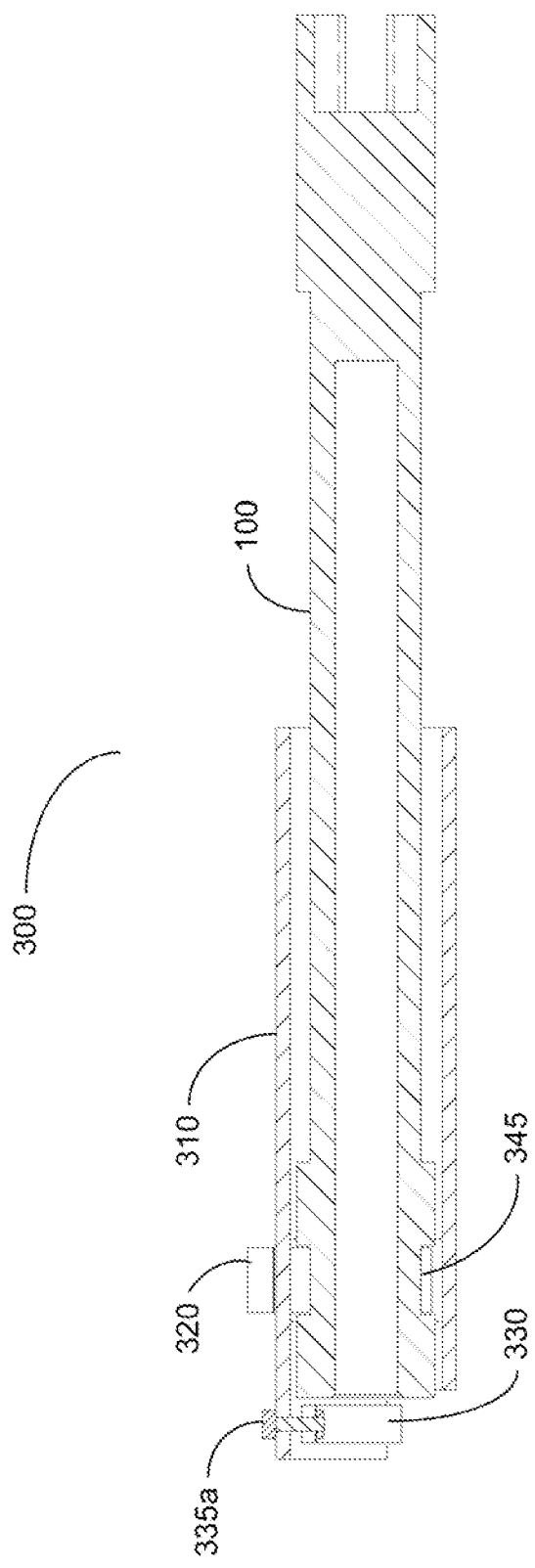
FIG. 4 illustrates a sectional view of an exemplary embodiment of an extension secured using a clamp system.

FIG. 4 illustrates a sectional view of an exemplary embodiment of tubular hollow extension 100 secured using clamp system 300.

Figure 5:
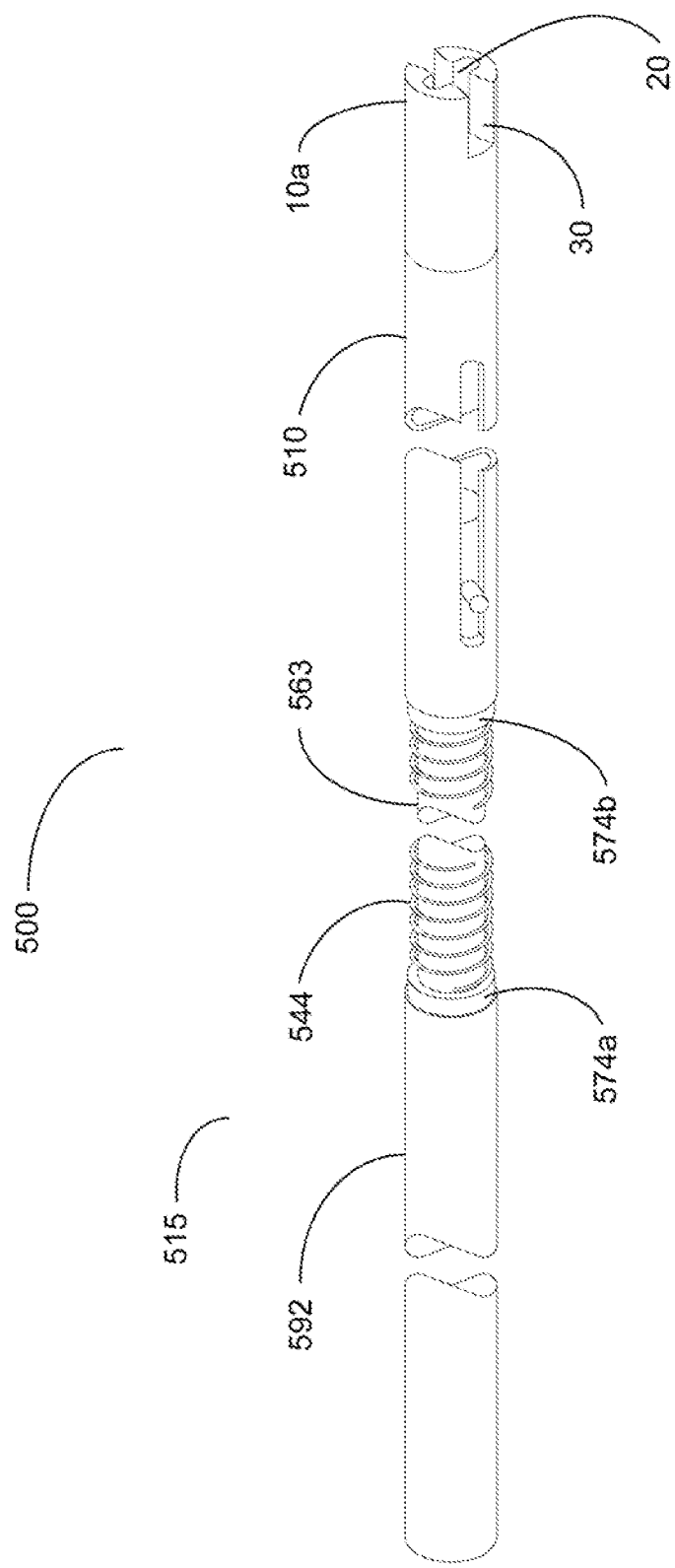
FIG. 5 illustrates an exemplary embodiment of a hyper-extension extension system.

FIG. 5 illustrates an exemplary embodiment of hyperextension tubular hollow extension system 500 which is operated manually, i.e., without a drill. Tubular hollow extension system 500 has two pole components 510, 515. Pole component 515 is comprised of telescoping pole 592 and spring release pole 563. Pole component 510 has a slightly larger diameter than spring release pole 563 which allows it to slide over spring release pole 563. First end 10a of pole component 510 further includes eyelet channel 20 and suspension member channel 30.

Spring release pole 563 has a compression spring 544 separated by washers 574a, 574b. Extension system 500 allows an individual to stand on the floor and install a concrete anchor into a ceiling without the use of a ladder, stilts, scaffolding or another elevation means. When pole components 510 and 515 are compressed and released, the compression spring 544 creates a force which drives concrete anchor 25 (not shown) into a pre-drilled hole in the ceiling without the need for a hammer.

What is claimed is:
1. A system for manually inserting a combined anchor and suspension member into a ceiling, the system comprising:
an anchor and suspension member combination;
a tubular hollow extension, said tubular hollow extension comprising at least two telescoping members, a first telescoping member having a first end that is config- ured for receiving the anchor and suspension member combination and a second telescoping member having a second end for manual grasping of the tubular hollow extension by a user; and a spring release pole and at least one compression spring linearly disposed between the members of the tubular hollow extension such that the at least two telescoping members are urged away from each other to exert upward pressure on the anchor and suspension combination during use of the apparatus;

wherein the system is used to manually hammer or torque the installation of the anchor and suspension member combination into the ceiling.

2. The system of claim 1 wherein the anchor and suspension member combination includes a concrete anchor, a suspension eyelet and a suspension wire.

3. The system of claim 1 wherein the second end of the second telescoping member is configured for use with a drill.

* * * * *